Oct. 22, 1957  J. W. WALSH ET AL  2,810,594
HOSE COUPLING WITH EXTRUSION APERTURES IN ONE MEMBER
Filed Oct. 13, 1950  3 Sheets-Sheet 3
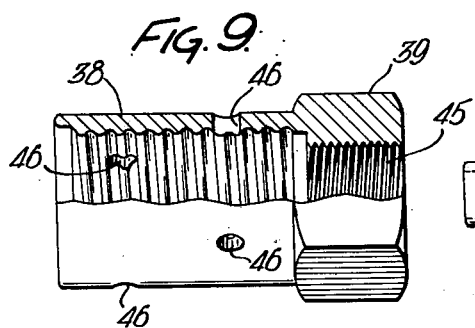
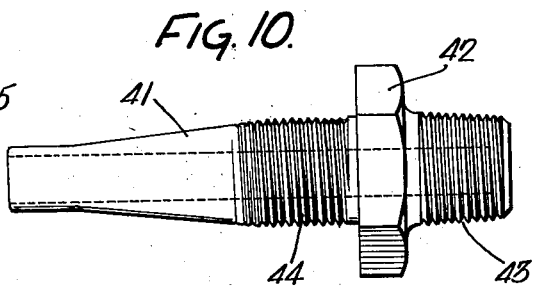
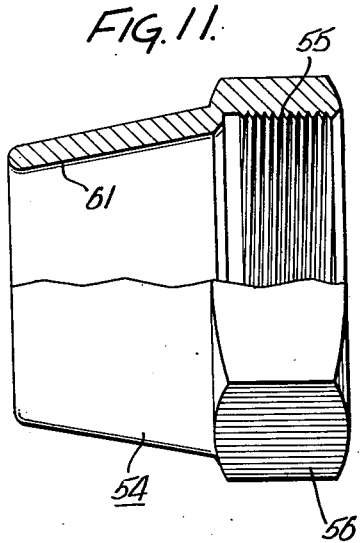
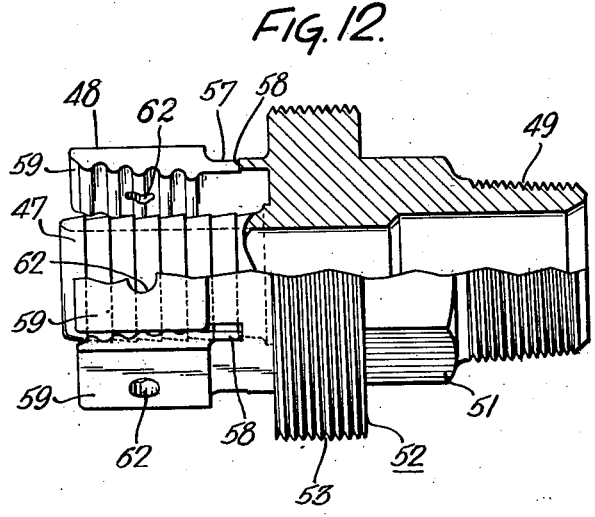
Inventors:
Joseph W. Walsh
Matthew McCombe
by their Attorneys
Howson & Howson

United States Patent Office

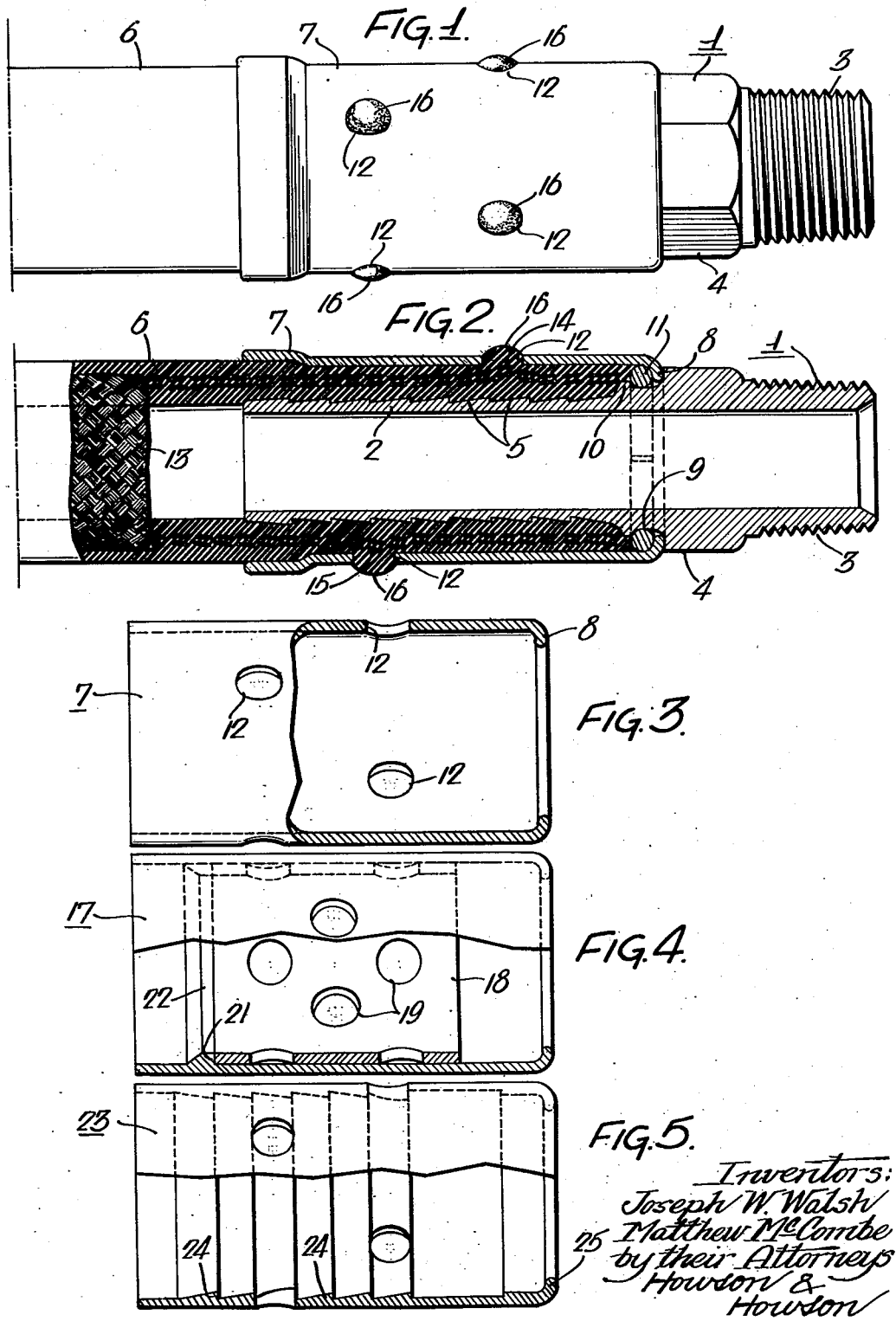

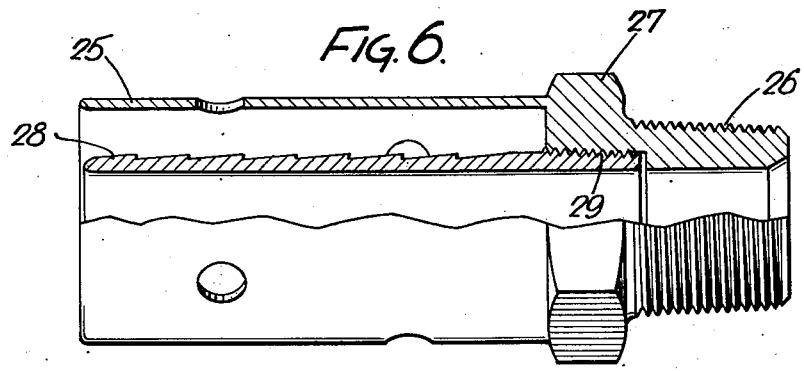
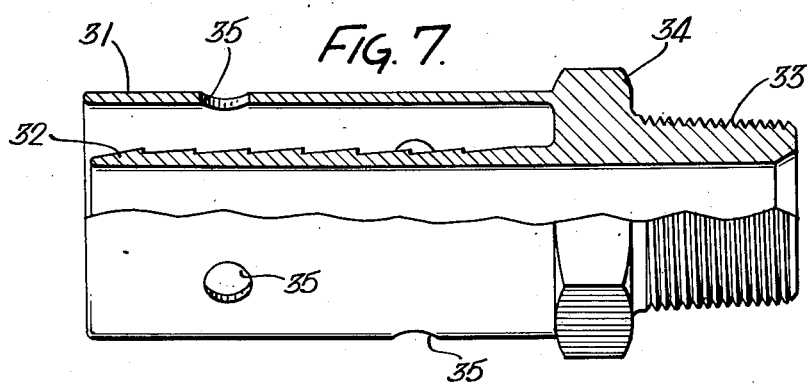
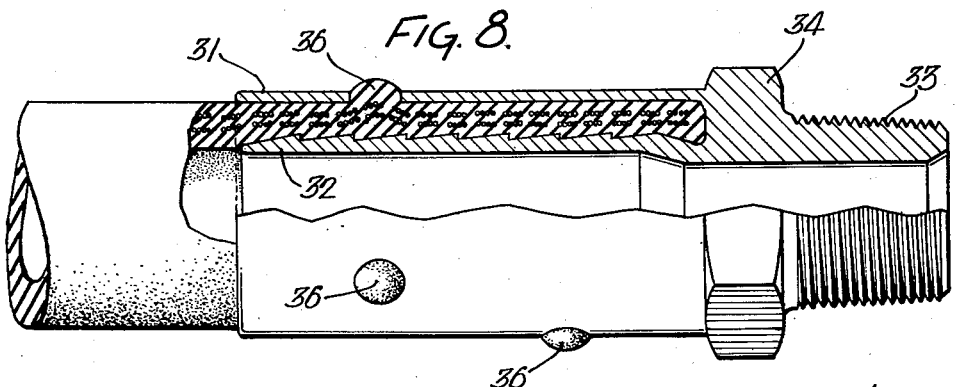

2,810,594
Patented Oct. 22, 1957

2,810,594

HOSE COUPLING WITH EXTRUSION APERTURES IN ONE MEMBER

Joseph W. Walsh, Philadelphia, and Matthew McCombe, Willow Grove, Pa., assignors to Mulconroy Co., Philadelphia, Pa., a corporation of Pennsylvania Application October 13, 1950, Serial No. 190,004

4 Claims. (Cl. 285—258)

This invention relates to hose couplings and more particularly to couplings of the type adapted for attachment to hose ends as hereinafter more particularly described.

In general, couplings of this type comprise a tubular nipple, adapted for insertion in the end of the hose, and a sleeve surrounding the nipple and within which the hose end is confined under pressure between the confronting surfaces of nipple and sleeve. Where the hose body comprises an outer rubber casing, which is resilient but noncompressible, it has been customary in order to effect a satisfactory union between the said body and the coupling elements, to strip the rubber down to the fabric or other carcass, or to the metallic or other reenforcing elements if such are present, so that in effect the sleeve is clamped to the carcass of the hose. This has had the effect of substantially reducing the bursting strength of the wall of the hose, particularly in the area immediately adjoining the inner end of the sleeve, as demonstrated by a tendency of the hose to blow out under pressure in that area.

A principal object of the present invention is to provide a coupling of the stated type affording an adequately strong and leak proof union between the coupling elements and the hose without requiring removal of the outer layers of rubber from the hose body.

Another object of the invention is to provide a coupling of the stated type which, while affording a strong union with the hose, will avoid the area of critical weakness mentioned above.

The invention resides further in certain structural details hereinafter described and illustrated in the attached drawings wherein;

Fig. 1 is a side view of the hose coupling attached to the hose;

Fig. 2 is a longitudinal sectional view through the coupling;

Fig. 3 is a side view partly in section of one of the elements of the coupling;

Figs. 4 and 5 are side views partly in section showing modified forms of the element illustrated in Fig. 3;

Fig. 6 is a side elevational view, partly in section, illustrating a modified form of coupling within the scope of the invention;

Fig. 7 is a side elevational view, partly in section, illustrating still another modification;

Fig. 8 is a side elevational and partial sectional view showing the coupling illustrated in Fig. 7 attached to a hose end;

Figs. 9 and 10, respectively, are views of the two major elements of still another form of coupling embodying the principle of the invention, and Figs. 11 and 12 are corresponding views illustrating still another form of coupling made in accordance with the invention.

With reference to the drawings the coupling therein illustrated comprises a tubular nipple 1 having a major terminal portion 2, which is adapted to fit into the end of the hose, and an opposite terminal portion which extends beyond the hose end, this latter portion including an externally threaded terminal portion 3, which provides means for attaching the coupling and the hose to a suitable fixture or to another hose section, and including also a hexagonal nut portion 4 constituting a means for applying turning torque to the nipple. As shown in Fig. 2 the outer surface of the terminal end portion 2 of the nipple is formed with tooth-like circumferential projections 5 to lock mechanically with the inner surface portions of the hose. In Figs. 1 and 2 the hose is indicated by the reference numeral 6.

The coupling comprises also a sleeve 7, shown in Fig. 3, which in assembly is adapted to embrace the outside of the hose around the inserted end portion 2 of the nipple 1. The sleeve has at one end an inturned flange 8 which extends into a recess 9 in the outer surface of the nipple 1 immediately adjoining the inner end of the nut section 4. In the embodiment of the invention illustrated in Fig. 2 this recess 9 also receives a split ring 11 which lies inside the sleeve and against the inner surface of the flange 8.

In assembling the elements of the coupling on the hose the sleeve containing the ring 11 is first applied to the outside of the hose, it being noted by reference to Fig. 3 that the original diameter of the sleeve affords a sliding fit between the sleeve and the hose. Thereafter the terminal portion 2 of the nipple is inserted through the open end of the sleeve and into the end of the hose so that the recess 9 will lie opposite the ring 11 and flange 8. The sleeve 7 is then compressed radially, by suitable mechanism, over the major portion of its length so that it assumes the position shown in Fig. 2, the hose end being thereby clamped between the sleeve and the inserted end 2 of the nipple 1 with the flange 8 and ring 11 confined and solidly anchored within the recess 9.

With reference to the operation described in the preceding paragraph, it will be understood that the split ring 11 is originally in expanded state and that contraction of the proximate end of the sleeve necessarily also contracts the ring. In process of contraction the ring slides down the inclined face of the rib 10 of the nipple which forms one side of the recess 9, and by pressure on the inside of flange 8 forces that flange to the other side of the recess and against the side of the nut section 4 of the nipple. When the operation is completed, the ring and flange will have been solidly clamped in and between the sides of the recess and will have united the sleeve and nipple into a solid unit wherein the parts are immovably fixed with respect to each other both axially and circumferentially.

In accordance with the invention the sleeve 7 is provided with a plurality of apertures 12 in the wall thereof and these apertures afford relief for the outer resilient cover of the hose when the sleeve is compressed upon the latter, it being understood that resilient rubber is displaceable but non-compressible. When, therefore, the sleeve is compressed on the hose the rubber in the outer surface portions, displaced by the radial contraction, will flow into and through the apertures 12, as illustrated in Fig. 2, thereby producing a highly effective mechanical interlock between the body of the hose and the sleeve.

It will be noted also that compression of the sleeve as described above and the resulting displacement of the outer rubber portions of the hose has the effect also of displacing the reenforcing elements of the hose, which in the present instance consists of a metallic mesh envelope illustrated at 13 in Fig. 2, outwardly at the apertures 12, this displacement of the metallic elements of the carcass being well illustrated at 14 and 15 in Fig. 2. Such deformation of the wire fabric materially augments the clamping pressure of the sleeve and nipple in uniting the elements of the coupling with the hose and effectively eliminates possibility of the fabric slipping from between the inner and outer rubber sections. The displaced areas of the metal fabric act also to afford solid backing for the extruded extensions 16 of the rubber in the apertures 12 and preclude any possibility of resilient displacement of the rubber from the aperture.

By the construction described above the full body of the hose is not only clamped but is mechanically interlocked between the sleeve and the nipple at the inner end of the coupling. The normal structure of the hose body is maintained and areas of critical weakness and possible leakage avoided.

Fig. 4 shows a modification within the scope of the invention, it being noted in this case that the sleeve 17 is provided with an inner sleeve or liner 18 containing the apertures 19 which receive the rubber of the hose displaced by contraction of the sleeve as described above. In this case the rubber is confined to the apertures 19 and is concealed by the sleeve 17, as distinct from the embodiment of Figs. 1, 2 and 3 wherein the displaced rubber will be exposed at point 16 on the outside of the sleeve. It will be noted by reference to Fig. 4 that the end of the sleeve 18 seats against a shoulder 21 on the inner surface of the sleeve 17, thus positively anchoring the sleeve 18 in the sleeve 17 against any tendency of the hose body to pull free from the coupling.

The sleeve shown in Fig. 5 and designated by the reference numeral 23 is identical with the sleeve 7 with exception that it is provided with tooth-like projections 24 on the inner surface for interlocking engagement with the outer surface of the hose, the flanged end portions 25 being also of the extra thickness to afford increased strength at that point.

It will be understood that the coupling herein illustrated as a desirable embodiment of the invention is subject to considerable modification in detail without departure from the invention as defined in the appended claims.

In Fig. 6, for example, we have illustrated a coupling corresponding functionally to that shown in Figs. 1 and 2 but differing structurally in that the apertured sleeve 25 is formed in this case integrally with the externally threaded terminal portion 26 and adjoining nut portion 27 of the coupling, the nipple 28 being threaded into the interior of the latter portion as indicated at 29. The operation of applying this coupling to the hose end corresponds to that described above in connection with the embodiment of Figs. 1 and 2.

It is immaterial whether the hose end is compressed between the sleeve and nipple by contraction of the sleeve, as described above, or expansion of the nipple in the hose end, or both. In the coupling illustrated in Fig. 7, the apertured sleeve 31 and nipple 32 are both integral parts of the terminal and nut portions, 33 and 34 respectively. In this case, also, the coupling is attached to the hose end by radial expansion of the nipple 32, the resulting compression of the hose end resulting in the displacement of the outer rubber element into the sleeve apertures 35 as indicated at 36 in Fig. 8.

The couplings illustrated in Figs. 9 to 12 as further embodiments of the invention are of a type capable of application to the hose in the field. In the coupling of Figs. 9 and 10, the sleeve 38 is formed integrally with the nut 39; and the nipple 41 also carries a nut 42 and is integral with the externally threaded end portion 43. The nipple in this instance is assembled in the sleeve from the nut end by way of threads 44 on the nipple and threads 45 in the nut, and the body of the nipple is tapered so that when the hose end has been inserted in the sleeve 38 and the nipple then threaded into the nut, the latter by reason of its tapered form will compress the wall of the hose against the inner surface of the sleeve and will cause the rubber of the hose to flow into the apertures 46 in the sleeve as described above.

In the coupling of Figs. 11 and 12 the nipple 47, the apertured sleeve 48, the threaded end portion 49, and the nut 51 are all integral parts of a single body designated generally by the reference numeral 52. In this case, however, the body member is provided with threads 53 for reception of an internally threaded member 54, the wall of which decreases in diameter toward the end opposite to that in which the threads 55 are formed. Around the threads at 56 the member 54 is shaped as a nut for reception of the turning wrench. In assembling this coupling on the hose, the end of the latter is passed through member 54 and onto the nipple 47 and between the nipple and the sleeve 48. The latter is joined to the body member by means of a flexible portion 57, and the sleeve in addition to the aperture 62 is slit or divided axially as indicated at 58 into a number of separate tongues 59. When the member 54 is turned inwardly on the threads 53 of the body member the conical end 61 engages the tongues 59 and cams or wedges them inwardly and forcibly upon the hose end so as to clamp the latter and to force the rubber outer portions of the hose outwardly into and through the apertures 62 in the tongues.

It will be understood that while in each of the illustrated embodiments of the invention the sleeve has been shown with circular apertures, there is no limitation as to the form or arrangement of the apertures in the sleeve except that they be of a size suitable for their function.

We claim:

1. A coupling for hose of the type having an outer thick wall portion of rubber or like substantially non-compressible resilient material, said coupling comprising a sleeve for application externally to an end of said hose and forming the outer wall of the coupling, said sleeve having a cylindrical bore substantially equal in diameter to the external diameter of the hose so as to receive the end of the latter without material distortion of said outer resilient portion, a nipple for insertion in said hose end and corresponding approximately in diametrical dimension to the bore of the hose so as to be readily insertable in the latter, means for uniting said sleeve to the nipple at a point intermediate the ends of the latter and independently of the hose, said nipple and sleeve constituting elements of a clamp between which the wall of the hose end may be confined under pressure and one at least of said elements being susceptible to permanent distortion radially by pressure so as to clamp the wall of the hose solidly between said elements with accompanying material radial contraction of the said outer resilient portion, and said sleeve having apertures affording passage through the wall of the sleeve for free, unobstructed flow of the said resilient material of the outer wall portion of the hose to and beyond the outer peripheral surface of the sleeve under the clamping pressure of said sleeve and nipple and in amount to permit the said radial contraction of the resilient material over substantially the entire length of the sleeve without axial extrusion of said material from between the sleeve and the nipple.

2. A coupling for hose of the type having an outer thick wall portion of rubber or like substantially non-compressible resilient material, said coupling comprising a sleeve for application externally to an end of said hose and forming the outer wall of the coupling, said sleeve having a cylindrical bore substantially equal in diameter to the external diameter of the hose so as to receive the end of the latter without material distortion of said outer resilient portion, a nipple for insertion in said hose end and corresponding approximately in diametrical dimension to the bore of the hose so as to be readily insertable in the latter, said nipple and sleeve constituting elements of a clamp between which the wall of the hose end may be confined under pressure and one at least of said elements being susceptible to permanent distortion radially by pressure so as to clamp the wall of the hose solidly between said elements with accompanying material radial contraction of the said outer resilient portion, and said sleeve having apertures affording passage through the wall of the sleeve for free unobstructed flow of the said resilient material of the outer wall portion of the hose to and beyond the outer peripheral surface of the sleeve under the clamping pressure of said sleeve and nipple and in amount to permit the said radial contraction of the resilient material over substantially the entire length of the sleeve without axial extrusion of said material from between the sleeve and the nipple.

3. A hose coupling according to claim 2 wherein the sleeve constitutes the radially distortable element.

4. A coupling for hose of the type having an outer thick wall portion of rubber or like substantially non-compressible resilient material, said coupling comprising a sleeve for application externally to an end of said hose and forming the outer wall of the coupling, said sleeve having a cylindrical bore substantially equal in diameter to the external diameter of the hose so as to receive the end of the latter without material distortion of said outer resilient end portion, a nipple for insertion in said hose end and corresponding approximately in diametrical dimension to the bore of the hose so as to be readily insertible in the latter, means for uniting said sleeve to the nipple at a point intermediate the ends of the latter and independently of the hose, said nipple and sleeve when assembled one within the other and so connected forming therebetween a cylindrical annular recess conforming substantially in shape and dimension to the wall of the hose and constituting elements of a clamp between which the wall of the hose end may be confined under pressure, and one at least of said elements being susceptible to permanent distortion radially by pressure so as to clamp the wall of the hose inserted in said recess solidly between said elements with accompanying material radial contraction and resultant displacement of the said outer resilient non-compressible portion, and said sleeve having radial apertures affording free unobstructed outward flow to and beyond the outer peripheral surface of the sleeve of the said resilient material of the outer wall portion of the hose so displaced, said apertures having a collective capacity for said flow related to the said contraction and to the total volume of the material thereby displaced and being distributed over the area of said displacement so as to accommodate said displaced material without axial extrusion of the material from the said recess between the nipple and sleeve and to form in each of said apertures a solid pin of said material projecting from and integral with the said outer wall portion of the hose and having its side surface solidly abutting the side wall defining the aperture about the entire periphery of the pin and over a substantial part at least of the radial length of the aperture so that the pin is operative in shear to resist separation of the coupling from the hose.

References Cited in the file of this patent

UNITED STATES PATENTS

| | | |
|---|---|---|
| Re. 19,865 | Eastman | Feb. 25, 1936 |
| 591,468 | Gold | Oct. 12, 1897 |
| 2,146,756 | Miller | Feb. 14, 1939 |
| 2,273,398 | Couty | Feb. 17, 1942 |
| 2,401,921 | Fisher et al. | June 11, 1946 |
| 2,410,600 | Cowles | Nov. 5, 1946 |
| 2,420,617 | Paquin | May 13, 1947 |
| 2,631,047 | Spender | Mar. 10, 1953 |